March 26, 1946. J. R. BLAKE 2,397,234
BRAKE VALVE
Filed April 29, 1943  2 Sheets-Sheet 1
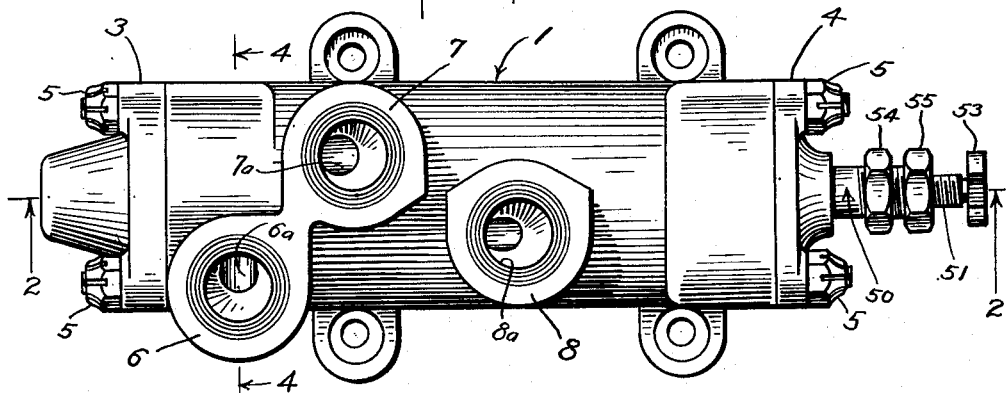
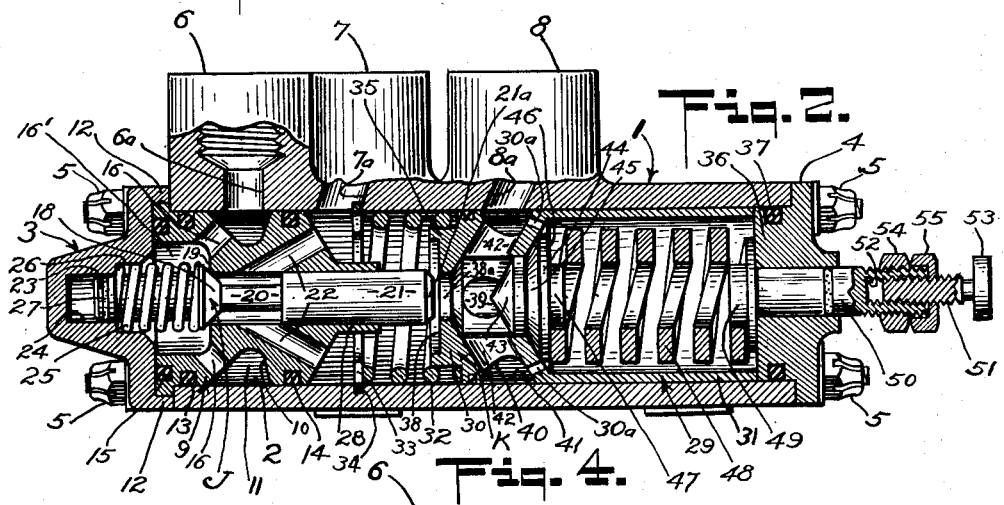
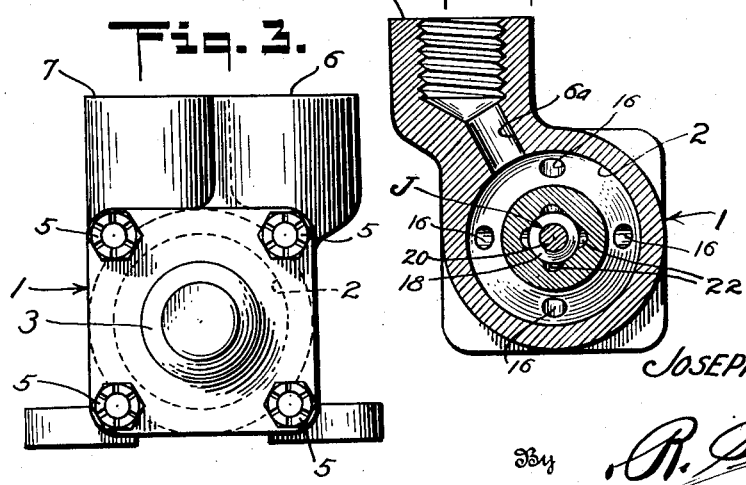
Inventor
JOSEPH R. BLAKE
By R. S. Berry
Attorney

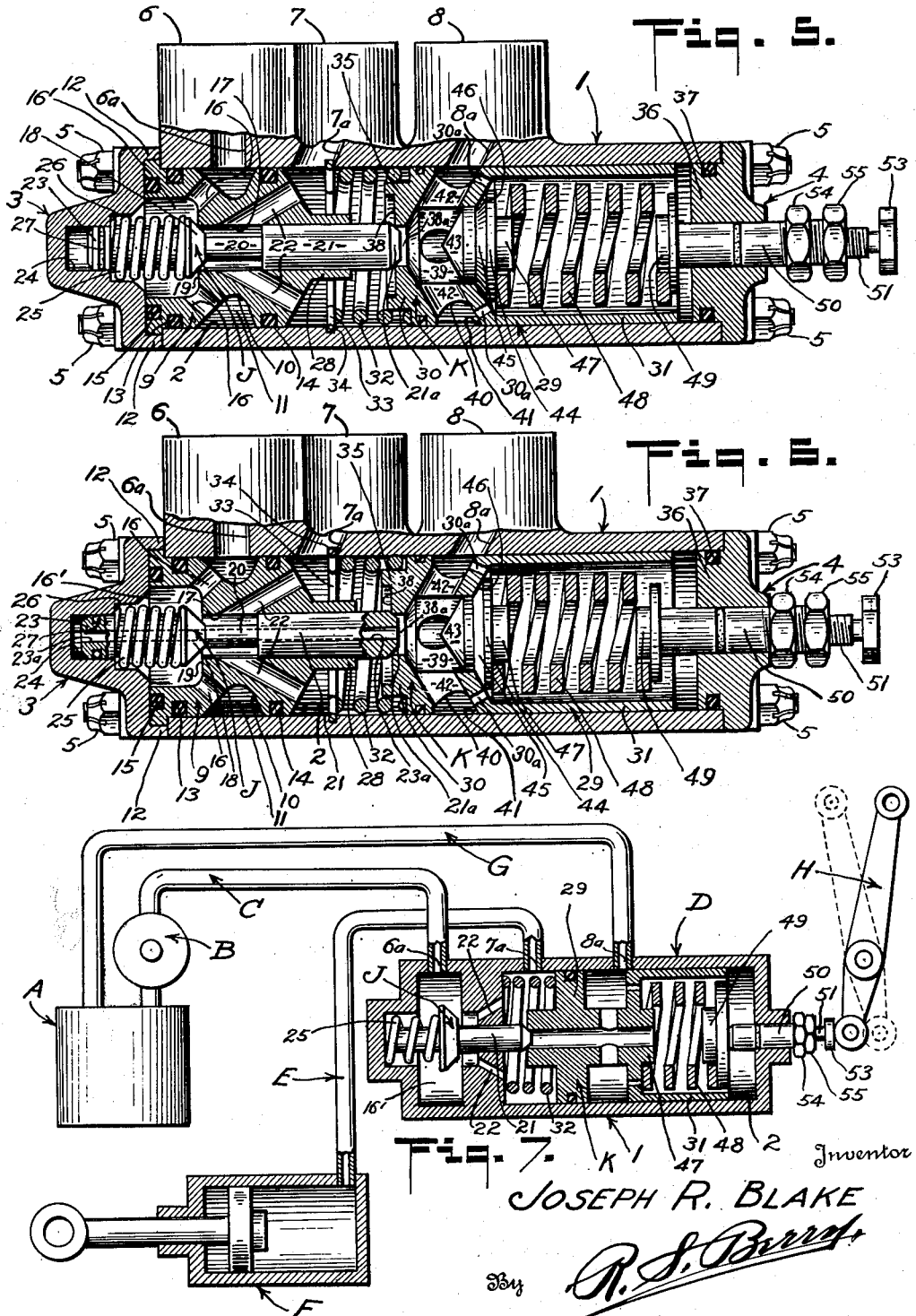

Patented Mar. 26, 1946

2,397,234

UNITED STATES PATENT OFFICE 2,397,234

BRAKE VALVE

Joseph R. Blake, La Crescenta, Calif., assignor to Adel Precision Products Corp., a corporation of California Application April 29, 1943, Serial No. 485,079

10 Claims. (Cl. 303—54)

This invention relates to a valve which is especially designed for controlling the fluid pressure landing wheel brakes of aircraft.

The primary object of this invention is to provide a brake valve for the purpose described which embodies improvements over similar valves heretofore used, particularly as to smoothness and reliability of operation, simplicity of construction, elimination of many costly machining operations, ease of operation, greater nicety of control of the brakes, and accessibility of the parts for inspection and parts replacement without requiring the breaking of any of the fluid lines.

Another object of my invention is to provide a brake valve of the character described in which the valve housing or body member is formed with a simple straight bore extending therethrough free from shoulders and counterbores so as to reduce machining costs and make it possible to readily and easily assemble and disassemble the valve members, springs and associated elements.

Another object is to provide in a brake valve of the character described an improved poppet type pressure valve assembly for controlling the flow of pressure fluid, including a cage insertable from one end of the bore and subject to ready replacement to provide valve seats and stems of different diameters so that a fully or a partially balanced valve may be employed.

Another object of my invention is to provide in a brake valve of the character described a novel piston construction having its head formed with a valve seat and ports of such form and arrangement as will insure a reliable and smooth operation of the piston at all times and reduce machining costs, said piston also having a relatively long and efficient skirt-like guide member which houses the main spring of the unit and an improved self centering spring keeper which seats within and closes a central opening in the head of the piston and applies a centered operating force to the piston head in such manner as to insure a smooth piston action fully and accurately responsive to the fluid and other operating forces applied thereto whereby a quicker response of the brake as to the setting and release thereof and a greater nicety of control is afforded.

With the foregoing objects in view, together with such other objects and advantages as may subsequently appear, the invention resides in the parts and in the combination, construction and arrangement of parts hereinafter described and claimed; and illustrated by way of example in the accompanying drawings, in which:

Fig. 1 is a top plan view of a brake valve embodying my invention;

Fig. 2 is a fragmentary longitudinal sectional view taken on the line 2—2 of Fig. 1 showing the normal or brake releasing position of the valve;

Fig. 3 is an end elevation of the valve;

Fig. 4 is a cross section taken on the line 4—4 of Fig. 1;

Fig. 5 is a longitudinal section similar to Fig. 2 showing the return valve closed and the pressure valve in static condition preliminary to opening;

Fig. 6 is a view similar to Figs. 2 and 5 showing the valve in open or brake applying position;

Fig. 7 is a schematic view of a fluid operative brake system including my improved valve.

Referring more specifically to the accompanying drawings, particularly Fig. 7 which shows how my improved valve may be employed in a fluid pressure brake system, it is seen that such a system includes a fluid reservoir A, a fluid pump B connected therewith, a pressure line C leading from the pump to my improved brake valve D, a cylinder line E controlled by valve D for conducting fluid to and from a fluid responsive brake operating cylinder or like means F, a return line G leading from the valve D to the reservoir A, and a valve operating lever H such as may be operated by means of a pedal or other means (not shown) for manipulating the valve to apply and release the brakes as desired.

The brake valve hereof includes an elongated substantially cylindrical body member or housing I having a straight bore 2 of uniform diameter throughout and closed at the ends of the housing by means of flanged caps 3 and 4 held in place by suitable fastenings 5.

Conveniently arranged in a group on one side of the housing are internally screw threaded nipples 6, 7 and 8 for coupling the pressure line C, cylinder line E and return line G, respectively with pressure, cylinder and return ports designated 6a, 7a and 8a respectively and arranged at points axially spaced apart along the bore 2.

In accordance with my invention a pressure valve unit J is mounted in the bore 2 being extended through the end of the bore closed by the cap 3, into the desired position. This unit includes a cylindrical valve cage 9 having a circumferential duct 10 intermediate its ends providing an annular chamber 11 in direct communication with the pressure port 6a. When the cage 9 is inserted into the bore 2 a flange 12 on the cage overlies the end of the housing as shown in Fig. 2 and acts as a stop to align the duct 10 with the pressure port 6a. This flange is clamped between the housing and the cap 3 to securely hold the cage in place.

Packing rings 13 and 14 of preferably circular cross section are disposed adjacent the ends of the cage for making a fluid tight seal around said ends and a similar packing ring 15 is carried in the outer end of the cage to form a fluid tight seal against the cap 3.

Diagonally extended intake ports 16 are formed in the cage 9 for communicating the annular chamber 11 with a valve chamber 16' formed as an enlargement of the outer end portion of the bore 17 extending through the cage.

A poppet type pressure valve 18 is mounted in the valve chamber 16' so as to seat against a valve seat 19 and has a short stem portion 20 and a contiguous enlarged piston-like stem portion 21 which latter serves as a valve guide and has a working fit in bore 17. The short stem portion 20 is of such smaller diameter than the bore 17 that fluid may flow freely through the bore 17 to diagonally extended outlet ports 22 formed in the cage for conducting pressure fluid into that portion of the bore with which the cylinder port 7a is communicated. The portion of the bore 17 in the cage 9 beyond the diagonal ports 22 is closed by the guide portion 21 of the valve stem.

A piston-like guide member 23 is extended like a valve stem from the center of the outer face of the pressure valve 18 and has a working fit in a bore 24 therefor formed in the cap 3. The bore 24 is counterbored to receive a spring 25 mounted on the guide 23 and to define a shoulder 26 against which the outer end of said spring engages. The inner end of this spring rests against the outer face of the valve 18 and urges the valve against its seat. A suitable packing ring 27 is provided on the guide member 23 and it is now seen that the pressure valve is most effectively guided on opposite sides thereof by the guide members 21 and 23 to insure a smooth and quickly responsive valve action and a reliable performance over long periods of use, the guiding action being increased by a tubular extension 28 on the inner end of the guide member and the projection of the guide member 21 through and well beyond said extension.

It should be noted that the pressure valve 18 is substantially balanced so that but a small amount of the fluid pressure assists the spring 25 in closing the valve, thereby reducing the operating load and assuring a quick response of the valve and the brake controlled thereby. This is provided for by employing a guide member 23 having a diameter but slightly less than that of the valve seat 19. However, a full balance or any desired "unbalance" may be provided for by substituting cage units (such as the one 9) having valve seats and valve guide members of the same or such differential diameters as will best suit the conditions at hand.

A reciprocable piston-valve unit K is mounted in the bore 2 for cooperation with the pressure valve unit J and includes a piston 29 having a head 30 and a long skirt or guide portion 31. The piston unit is inserted in the bore 2 from the end closed by the cap 4 so that the head 30 thereof engages one end of a spring 32 which has its other end engaged with a flat snap ring 33 seated in a small circumferential groove 34 formed in the bore 2.

The outer face of the head of the piston is formed with a boss-like keeper 35 for the spring 32 which normally holds the piston spaced from the outer end of the extended guide portion 21 of the valve stem, with the outer end of the skirt or guide portion 31 of the piston against the cap 4. In this connection it is seen that the cap 4 has a portion 36 extended into the bore 2 and provided with a circumferential sealing ring 37 of circular cross section forming a fluid tight seal.

The outer end of the stem portion 21 of the pressure valve unit J is beveled and serves as a return valve member 21a adapted to seat against an annular seat 38 constituting the outer edge of a return fluid intake port 38a in the center of the piston head 30.

When the stem portion 21 engages the seat 38, the pressure valve will be unseated upon continued movement of the piston. The port 38a, when the valve member 21a is unseated, affords communication between the cylinder port portion of the bore 2 and a return fluid chamber 39 formed in the piston head 30. The head 30 is provided with a circumferential duct 40 dimensioned to define an annular chamber 41 which is open to the return port 8a in all positions of the piston. Return fluid outlet ports 42 extend through the piston head 30 so as to open into the duct 40 for conducting return fluid from the chamber 39 into the annular chamber 41. In this manner a return passage extends through the piston head for communication with the return port 8a through which return fluid enters the return line G shown in Fig. 7. At this point it should be noted that a bleed port 23a extends through the guide member 23, pressure valve 18 and the stem portions 20 and 21 so that it affords communication of the portion of bore 24 beyond the member 23, with both the cylinder port 7a and the return port 8a when the return valve member 21a is unseated as shown in Fig. 2. When this return valve member 21a is seated and the member 23 is pushed further into bore 24 as during the unseating of the pressure valve 18 as shown in Fig. 6, the fluid in the bore 24 will be forced through the passage 23a and the return passage in the piston head 30 and discharged through the return port 8a.

As here shown the inner side of the chamber 39 opens through the inner face of the piston head 30 into the hollow guide portion 31 of the piston but this open side of the chamber is closed by a conical boss 43 on a disk-like spring keeper 44 mounted in the guide portion 31. The keeper 44 has a beveled annular face 45 seating on a similarly beveled seat 46 on the piston head 30. A boss 47 on the keeper extends into the inner end of a coiled spring 48 housed in the guide portion 31 of the piston. The other end of this spring engages an axially movable spring keeper 49 having a suitably packed stem 50 slidable in the cap 4.

A screw threaded push rod 51 is threaded into a screw threaded bore 52 in the stem 50 so as to be axially adjustable relative thereto to regulate the thrust of the stem and the pressure valve opening movement of the piston thereby regulating the braking action of the brakes controlled by the brake valve.

A head 53 on the outer end of the push rod 51 is adapted to be engaged by the brake operating lever H to manipulate the piston. A lock nut 54 is threaded on the stem 50 and is adapted to abut a cap nut 55 threaded on the push rod whereby the push rod may be locked in adjusted positions. The cap nut freely telescopes the outer end of the stem as shown in Fig. 2.

As shown in Fig. 2 when the valve unit is in normal and brake released position the spring 32 is compressed and holds the piston 29 so that the seat 38 thereon is spaced from the return valve member 21a on the stem portion 21, the main spring 48 being then not under any appreciable compression. At this time the spring 25 seats the pressure valve 18a and the brakes controlled by the valve unit are fully released and subject to being applied upon manipulation of the valve unit.

To operate the valve unit to apply the brakes controlled thereby, the lever H is manipulated against the push rod 51 to push the stem 50 and keeper 49 inwardly against the spring 48 which transmits this force to the inner side of the head of the piston 29 through the keeper 44 thereby moving the piston so that the return valve portion 21a on the stem 21 will seat on the seat 38 in the head of the piston and close the return fluid passage through the piston head before the stem 21 is moved to unseat the pressure valve 18.

Continued movement of the piston 29 toward the pressure valve 18 following the seating of the return valve member 21a, will push the stem 21 so that the valve 18 will be unseated with the valve 21a remaining seated. Pressure fluid will now be effective to operate the brakes as it will flow through bore 17 in the cage 9, passages 22, bore 2, port 7a and cylinder line E to the brake operating cylinder F. During the opening of the pressure valve 18 fluid in the bore 24 will be forced by the piston-like guide member 23 through the bleed passage 23a in the stem 17 into the return passage through the head 30, the piston thereby preventing interference with the movement of the guide 23 in the bore 24 therefore.

It is seen inasmuch as the piston-like guide member 23 is of a diameter nearly equal to that of the valve seat 19 and the valve is substantially balanced very little force beyond that necessary to overcome the force of the springs 25 and 32 must be exerted to move the piston 29 to open the valve 18 and apply the brakes.

However, the braking action is determined by the force applied by the operator against the main spring 48 inasmuch as when the brake operating pressure builds in the brake cylinder and against the piston head 30 to a point greater than the force exerted by the spring 48 against the piston, the piston will be moved so as to compress the spring and allow the spring 25 to seat the pressure valve 18 and shut off the supply of pressure fluid to the brake cylinder while the return valve member 21a remains seated, thereby holding the brakes applied. In this manner the brakes may be gradually or otherwise applied and released as desired by regulating the force applied by the operator to the main spring 48.

As the piston 29 is moved to allow the valve 18 to seat, any fluid in the bore 2 between the piston and cap 4 will escape to the return port 8a through bleed ports 30a in the piston head 30.

To release the brakes the operator releases pressure on the spring 48 whereupon the spring 32 operates to move the piston 29 so that the return valve member 21a will be unseated as shown in Fig. 2 to allow fluid returned from the brake cylinder to pass through the piston head 30 to the return port 8a.

It is important to note that the valve units J and K are readily insertable and removable without disconnecting the fluid line from the valve housing and that the valve seats, valve members and associated parts are carried in said units and constructed and arranged so that they may readily be inspected and replaced. Moreover, due to the particular construction, arrangement and combination of the valve units and valve housing, sticking or jambing of the working parts or other failure is positively prevented and the valve assembly as a whole is more reliable as to performance and affords a greater nicety of control of the brakes.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a brake valve for controlling fluid pressure actuated brakes, a valve housing having a bore therein provided at axially spaced points with a pressure port, a cylinder port and a return port affording communication of the bore with a fluid pressure line, a brake cylinder line and a return line respectively, a cylindrical cage in said bore having an axial valve chamber at one end and an axial bore extending from said chamber through the other end of the cage, a circumferential duct formed in the cage between the ends thereof for reception of pressure fluid from said pressure port, an intake port in said cage extending between said duct and said chamber, an outlet port leading through the cage from said axial bore to that portion of the housing bore into which the cylinder port opens, a valve seat at the juncture of said axial bore and said chamber, a pressure valve mounted in said chamber for movement into and out of engagement with said seat, a guide member on said valve, a bore in one end of the housing for reception of said guide member, a spring interposed between said end of the housing and said valve for seating the valve, a stem on said valve having a piston portion in said axial bore and extended beyond the other end of said cage, and a reduced portion of the stem between the valve and piston portion providing a fluid passage in the axial bore between the valve chamber and said outlet port; a piston reciprocable in said housing bore between the cage and the other end of the housing and having a circumferential return fluid duct open to the return port in all positions of the piston, a return fluid passage in the piston for conducting return fluid from said cylinder port portion of the housing bore to said return fluid duct, said piston portion of said stem having its free end disposed to act as return valve and seat against the piston to close the return passage therein, spring means in the bore of the housing for normally holding the piston in position to maintain the pressure valve seated and the return passage open, and means for moving the piston to first engage the stem and close the return passage then unseat the pressure valve while maintaining the return passage closed, including a spring through which the piston operating force is transmitted and which will be compressed when the pressure of the fluid in the brake cylinder and against the piston becomes greater than said piston operating force, whereby the piston will be moved to seat the pressure valve while maintaining the return passage closed, and will allow the piston to be moved to open the return passage when said operating force is removed.

2. In a brake valve for controlling fluid pressure actuated brakes, a valve housing having a bore therein provided at axially spaced points with a pressure port, a cylinder port and a return port affording communication of the bore with a fluid pressure line, a brake cylinder line and a return line respectively, a cylindrical cage in said bore having an axial valve chamber at one end and an axial bore extending from said chamber through the other end of the cage, a circumferential duct formed in the cage between the ends thereof for reception of pressure fluid from said pressure port, an intake port in said cage extending between said duct and said chamber, an outlet port leading through the cage from said axial bore to that portion of the housing bore into which the cylinder port opens, a valve seat at the juncture of said axial bore and said chamber, a pressure valve mounted in said chamber for movement into and out of engagement with said seat, a guide member on said valve, a bore in one end of the housing for reception of said guide member, a spring interposed between said end of the housing and said valve for seating the valve, a stem on said valve having a piston portion in said axial bore and extended beyond the other end of said cage, and a reduced portion of the stem between the valve and piston portion providing a fluid passage in the axial bore between the valve chamber and said outlet port; a piston reciprocable in said housing bore between the cage and the other end of the housing and having a circumferential return fluid duct open to the return port in all positions of the piston, a return fluid passage in the piston for conducting return fluid from said cylinder port portion of the housing bore to said return fluid duct, said piston portion of said stem having its free end disposed to act as return valve and seat against the piston to close the return passage therein, spring means in the bore of the housing for normally holding the piston in position to maintain the pressure valve seated and the return passage open, and means for moving the piston to first engage the stem and close the return passage then unseat the pressure valve while maintaining the return passage closed, including a spring through which the piston operating force is transmitted and which will be compressed when the pressure of the fluid in the brake cylinder and against the piston becomes greater than said piston operating force, whereby the piston will be moved to seat the pressure valve while maintaining the return passage closed; and will allow the piston to be moved to open the return passage when said operating force is removed, said guide member having a diameter of a size relative to that of the valve seat such that the greater part of the fluid pressure in the valve chamber is ineffective to urge the pressure valve toward its seat.

3. In a brake valve for controlling fluid pressure actuated brakes, a valve housing having a bore therein provided at axially spaced points with a pressure port, a cylinder port and a return port affording communication of the bore with a fluid pressure line, a brake cylinder line, and a return line respectively, a cylindrical cage in said bore having an axial valve chamber at one end and an axial bore extending from said chamber through the other end of the cage, a circumferential duct formed in the cage between the ends thereof for reception of pressure fluid from said pressure port, an intake port in said cage extending between said duct and said chamber, an outlet port leading through the cage from said axial bore to that portion of the housing bore into which the cylinder port opens, a valve seat at the juncture of said axial bore and said chamber, a pressure valve mounted in said chamber for movement into and out of engagement with said seat, a guide member on said valve, a bore in one end of the housing for reception of said guide member, a spring interposed between said end of the housing and said valve for seating the valve, a stem on said valve having a piston portion in said axial bore and extended beyond the other end of said cage, and a reduced portion of the stem between the valve and piston portion providing a fluid passage in the axial bore between the valve chamber and said outlet port; a piston reciprocable in said housing bore between the cage and the other end of the housing and having a circumferential return fluid duct open to the return port in all positions of the piston, a return fluid passage in the piston for conducting return fluid from said cylinder port portion of the housing bore to said return fluid duct, said piston portion of said stem having its free end disposed to act as return valve and seat against the piston to close the return passage therein, spring means in the bore of the housing for normally holding the piston in position to maintain the pressure valve seated and the return passage open, means for moving the piston to first engage the stem and close the return passage then unseat the pressure valve while maintaining the return passage closed, including a spring through which the piston operating force is transmitted and which will be compressed when the pressure of the fluid in the brake cylinder and against the piston becomes greater than said piston operating force, whereby the piston will be moved to seat the pressure valve while maintaining the return passage closed; and will allow the piston to be moved to open the return passage when said operating force is removed, said guide member having a diameter of a size relative to that of the valve seat such that the greater part of the fluid pressure in the valve chamber is ineffective to urge the pressure valve toward its seat, and a passage extending through said guide member, valve and stem for discharging fluid from the bore for said guide member into the return passage.

4. In a brake valve for controlling fluid pressure actuated brakes, a valve housing having a bore therein provided at axially spaced points with a pressure port, a cylinder port and a return port affording communication of the bore with a fluid pressure line, a brake cylinder line and a return line respectively, a cylindrical cage in said bore having an axial valve chamber at one end and an axial bore extending from said chamber through the other end of the cage, a circumferential duct formed in the cage between the ends thereof for reception of pressure fluid from said pressure port, an intake port in said cage extending between said duct and said chamber, an outlet port leading through the cage from said axial bore to that portion of the housing bore into which the cylinder port opens, a valve seat at the juncture of said axial bore and said chamber, a pressure valve mounted in said chamber for movement into and out of engagement with said seat, a guide member on said valve, a bore in one end of the housing for reception of said guide member, a spring interposed between said end of the housing and said valve for seating the valve, a stem on said valve having a piston portion in said axial bore and extended beyond the other end of said cage, and a reduced portion of the stem between the valve and piston portion providing a fluid passage in the axial bore between the valve chamber and said outlet port; a piston reciprocable in said housing bore between the cage and the other end of the housing and having a circumferential return fluid duct open to the return port in all positions of the piston, a return fluid passage in the piston for conducting return fluid from said cylinder port portion of the housing bore to said return fluid duct, said piston portion of said stem having its free end disposed to act as return valve and seat against the piston to close the return passage therein, spring means in the bore of the housing for normally holding the piston in position to maintain the pressure valve seated and the return passage open, and means for moving said piston to first engage the stem and close the return passage and then unseat the pressure valve.

5. In a brake valve for controlling fluid pressure actuated brakes, a valve housing having a bore therein provided at axially spaced points with a pressure port, a cylinder port and a return port affording communication of the bore with a fluid pressure line, a brake cylinder line and a return line respectively, a pressure valve means in said bore for controlling the flow of pressure fluid from the pressure port to the cylinder port including a valve stem, a piston reciprocable in said bore having a circumferential duct open to the return port in all positions of the piston, a return fluid chamber in the head of the piston, an outlet port leading from said chamber into said duct, an intake port in the outer face of the head of the piston opening into said chamber adapted to be closed by said stem, spring means in the bore for normally holding the piston in position to maintain the pressure valve means closed and the piston intake port open, said chamber having an opening therein through the inner face of the head of the piston, a spring keeper, a conical projection in said keeper closing said opening, a spring in the bore having one end engaged with said keeper, and means for transmitting through the spring an operating force for moving the piston to engage the stem to first close the intake port then unseat the pressure valve means.

6. In a brake valve for controlling fluid pressure actuated brakes, a valve housing having a bore therein provided at axially spaced points with a pressure port, a cylinder port and a return port affording communication of the bore with a fluid pressure line, a brake cylinder line and a return line respectively, a pressure valve means in said bore for controlling the flow of pressure fluid from the pressure port to the cylinder port including a valve stem, a piston reciprocable in said bore having a circumferential duct open to the return port in all positions of the piston, a return fluid chamber in the head of the piston, an outlet port leading from said chamber into said duct, an intake port in the outer face of the head of the piston opening into said chamber adapted to be closed by said stem, spring means in the bore for normally holding the piston in position to maintain the pressure valve means closed and the piston intake port open, said chamber having an opening therein through the inner face of the head of the piston, a spring keeper, a conical projection in said keeper closing said opening, a spring in the bore having one end engaged with said keeper, and means for transmitting through the spring an operating force for moving the piston to engage the stem to first close the intake port then unseat the pressure valve means, said keeper having an annular beveled face and a corresponding beveled seat portion for said annular face on the piston head.

7. In a brake valve for controlling fluid pressure actuated brakes, a valve housing having a bore therein provided at axially spaced points with a pressure port, a cylinder port and a return port affording communication of the bore with a fluid pressure line, a brake cylinder line and a return line respectively, a cylindrical cage in said bore having an axial valve chamber at one end and an axial bore extending from said chamber through the other end of the cage, means affording fluid communication between said pressure port and said chamber, an outlet port leading through the cage from said axial bore to that portion of the housing bore into which the cylinder port opens, a valve seat at the juncture of said axial bore and said chamber, a pressure valve mounted in said chamber for movement into and out of engagement with said seat, a spring positioned to seat said valve, a stem on said valve having a piston portion in said axial bore and extended beyond the other end of said cage, and a reduced portion of the stem between the valve and piston portion providing a fluid passage in the axial bore between the valve chamber and said outlet port; a piston reciprocable in said housing bore between the cage and the other end of the housing and having return fluid duct open to the return port in all positions of the piston, a return fluid passage in the piston for conducting return fluid from said cylinder port portion of the housing bore to said return fluid duct, said piston portion of said stem having its free end disposed to act as return valve and seat against the piston to close the return passage therein, spring means in the bore of the housing for normally holding the piston in position to maintain the pressure valve seated and the return passage open, and means for moving said piston to first engage the stem and close the return passage and then unseat the pressure valve.

8. In a brake valve for controlling fluid pressure actuated brakes, a valve housing having a bore therein provided at axially spaced points with a pressure port, a cylinder port and a return port affording communication of the bore with a fluid pressure line, a brake cylinder line and a return line respectively, a pressure valve means in said bore for controlling the flow of pressure fluid from the pressure port to the cylinder port including a valve stem, a piston reciprocable in said bore, said piston having a head containing a return fluid chamber, there being fluid communication between said return port and said return fluid chamber in all positions of the piston, an intake port in the outer face of the head of the piston opening into said chamber adapted to be closed by said stem, spring means in the bore for normally holding the piston in position to maintain the pressure valve means closed and the piston intake port open, said chamber having an opening therein through the inner face of the head of the piston, a spring keeper, a conical projection in said keeper closing said opening, a spring in the bore having one end engaged with said keeper, and means for transmitting through the spring an operating force for moving the piston to engage the stem to first close the intake port then unseat the pressure valve means, said keeper having an annular beveled face and a corresponding beveled seat portion for said annular face on the piston head.

9. In a brake valve structure, in combination, a valve body provided with a longitudinal bore with which communicate at axially spaced points a pressure port, a brake cylinder port and a return port, a valve cage anchored within one end portion of said bore, a valve chamber between said cage and the adjacent end of the bore, a valve in said chamber, a seat for said valve at the inner end of said chamber, a hollow piston element contained within the opposite end portion of said bore and slidably engaging the surface thereof, the head of said piston element and the adjacent end of said valve cage co-operating with said bore to define a chamber in communication with said brake cylinder port, a channel connecting said valve chamber which is at one end of the bore with said pressure port, said channel leading from one side of the aforesaid valve seat, a second channel affording communication between the other side of said valve seat and the chamber which is between said valve cage and piston element, said second channel being in communication with said brake cylinder port, said piston element having a head provided with a valve seat, means connected with the aforesaid valve and movable therewith to coact with said valve seat in the head of said piston element as a second valve, a channel in the head of said piston element affording communication between said return port and the last recited valve seat, and manually operable means for sequentially closing said second valve and opening said first valve, said means which is movable with said first valve being responsive to fluid pressure admitted through said pressure port to oppose said manual means and sequentially close said first valve and open said second valve.

10. In a brake valve structure, in combination, a unitary valve body provided with a longitudinal bore with which communicate at axially spaced points a pressure port, a brake cylinder port and a return port, a valve cage anchored within one end portion of said bore, a valve chamber between said cage and the adjacent end of the bore, a valve in said chamber, a seat for said valve at the inner end of said chamber, a hollow piston element within the opposite end portion of said bore and slidably engaging the surface thereof, the head of said piston element and the adjacent end of said valve cage cooperating with said bore to define a chamber in communication with said brake cylinder port, a channel connecting said valve chamber which is at one end of the bore with said pressure port, said channel leading from one side of the aforesaid valve seat, a second channel affording communication between the other side of said valve seat and the chamber which is between said valve cage and piston element, said second channel being in communication with said brake cylinder port, said piston element having a head provided with a valve seat, means connected with the aforesaid valve and movable therewith to coact with said valve seat in the head of said piston element as a second valve, a channel in the head of said piston element affording communication between said return port and the last recited valve seat, and manually operable means comprising a rod which projects axially into said bore for sequentially closing said second valve and opening said first valve, said means which is movable with said first valve being responsive to fluid pressure admitted through said pressure port to oppose said manual means and sequentially close said first valve and open said second valve, all the movable structures which are affected by the operation of said rod being contained in said bore.

JOSEPH R. BLAKE.